United States Patent Office 3,410,982
Patented Nov. 12, 1968

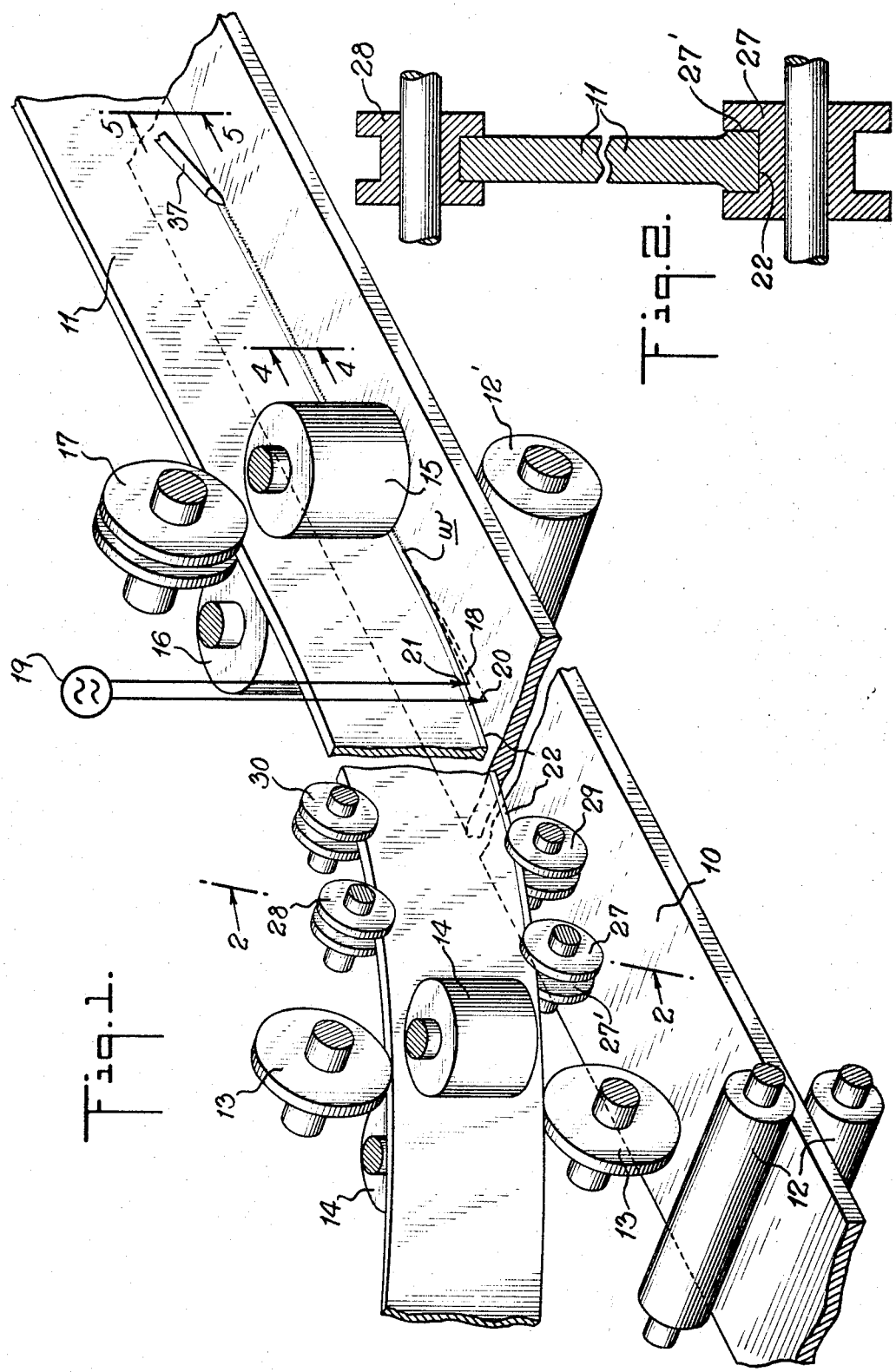

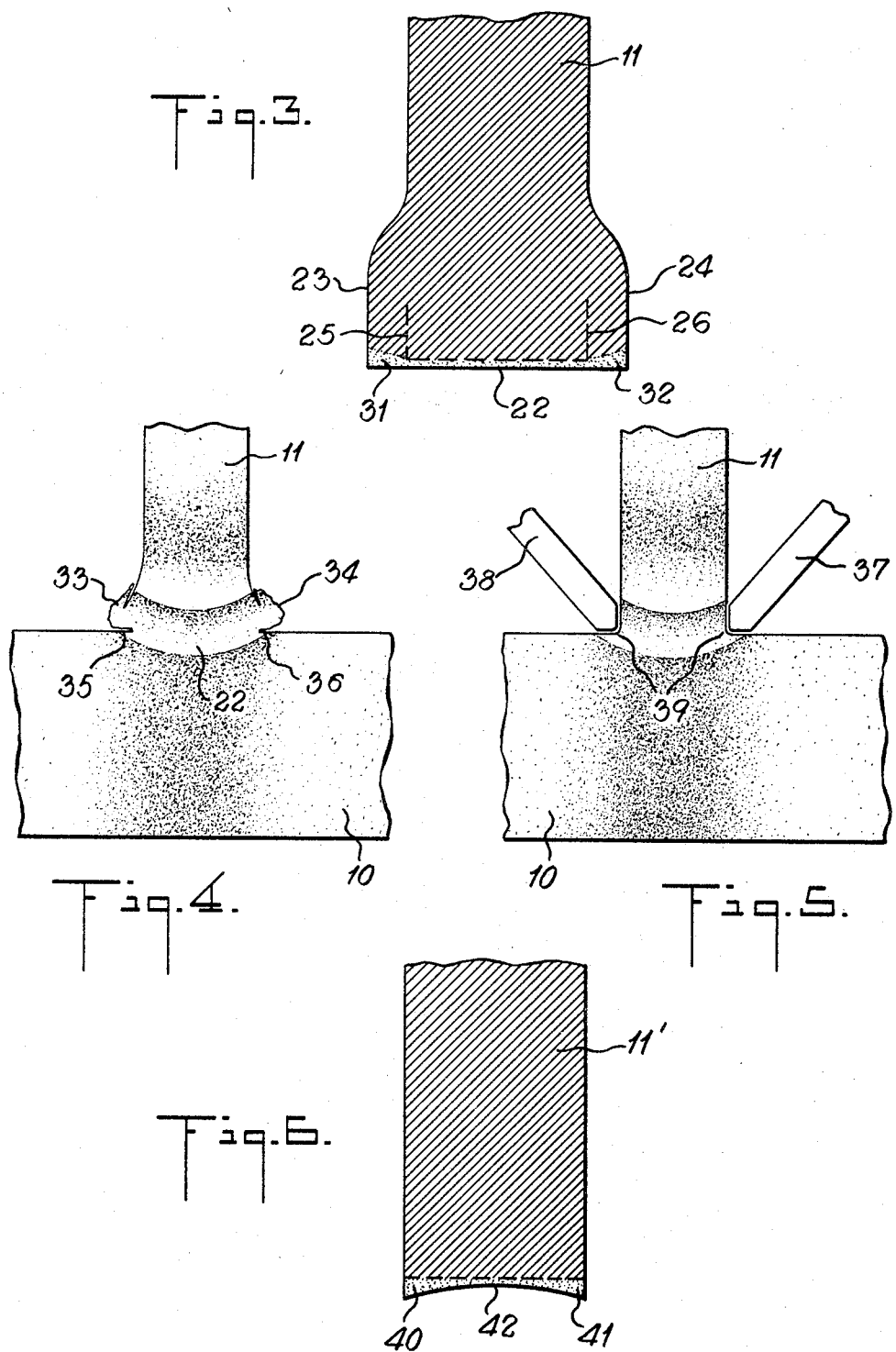

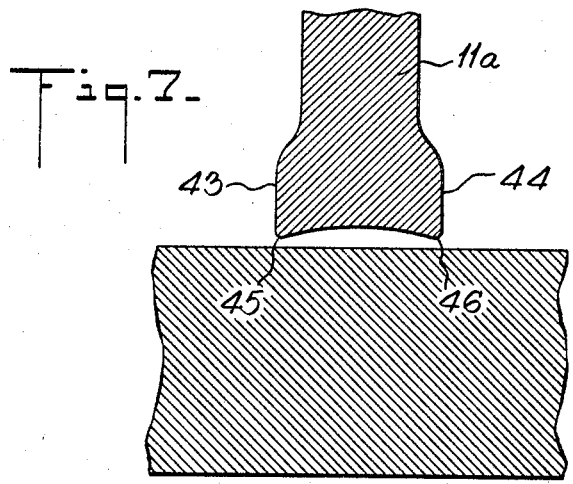
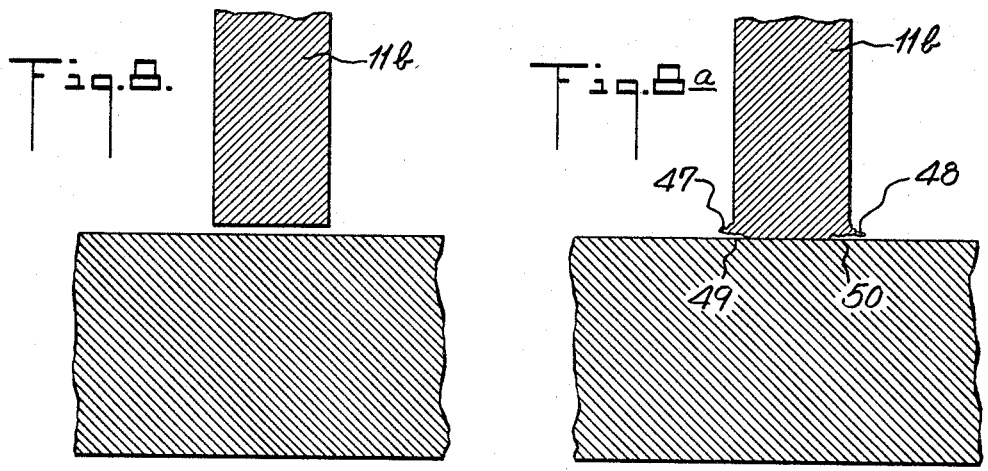
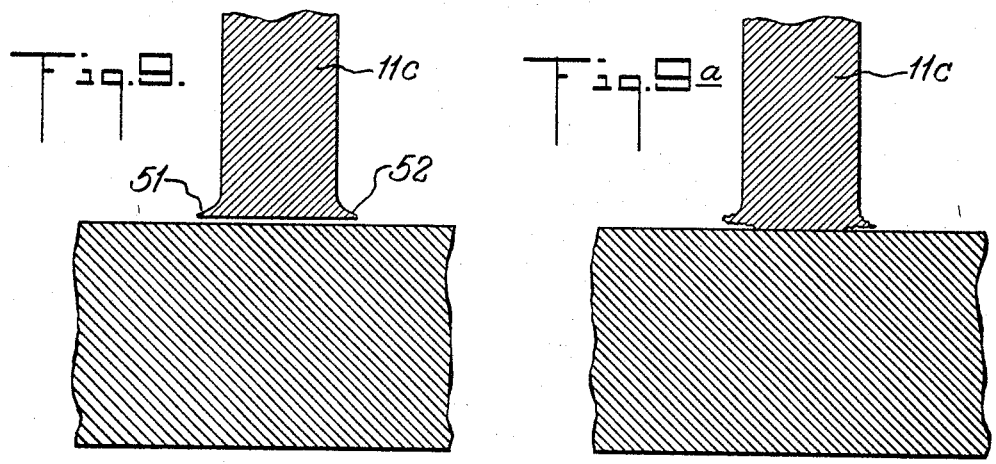

3,410,982
WELDING OF STRUCTURAL SHAPES BY HIGH FREQUENCY CURRENT
Jack Morris, Monsey, and Fred Kohler, New York, N.Y., assignors to American Machine & Foundry Company, New York, N.Y., a corporation of New Jersey
Filed Mar. 2, 1965, Ser. No. 436,627
8 Claims. (Cl. 219—107)

ABSTRACT OF THE DISCLOSURE

Process and apparatus for welding an edge of a strip-like member to the surface of another member using high frequency current and producing a weld which has a width at least susbtantially equal to the normal thickness of the strip-like member in which the strip is advanced with the other member along converging paths meeting at the weld point while high frequency current is supplied to the approaching faces and the edge of the strip is deformed prior to the application of the current thereto to provide projecting portions at the corners of the edge. After welding, extruded metal from the projecting portions may be removed.

---

This invention relates to the welding of structural shapes such as where a metal strip to form a web is to be welded on edge longitudinally of another metal strip which for example is to form a flange, thus providing a welded structure of T-shaped cross-section. In other cases, the strip comprising the web may be welded along both of its edges respectively simultaneously or successively to other strips forming flanges, so as to provide a structure having a cross-section of I or H shape. More particularly the invention concerns welding such structures by utilizing high frequency current to heat the surface portions which are to be welded together.

Methods for this purpose have heretofore been devised whereby a web strip and a flange strip are rapidly longitudinally advanced past a weld point with the web strip becoming welded on edge to the flange strip and while either one or both of the strips in advance of the weld point is made to follow a curved path so as to provide a V-shaped gap therebetween with its apex at the weld point. The high frequency current is applied by contacts respectively to the opposite sides of such gap, whereby the current flows from the contacts to and from the weld point along on the gap edge surfaces. The high frequency current on opposite sides of such gap at any one moment flows in opposite directions, and thus due to its high frequency characteristics, it becomes more and more closely concentrated along on the very surface portions which are to be welded together as they approach the weld point so that the metal becomes heated to welding temperature and softened principally only on the very surfaces which are to be welded. Preferably the frequency of the current is sufficiently high so that it is not distributed from such surfaces to any such extent as would cause softening of the metal in depth beneath such surfaces and thus when the parts are brought together under pressure at the weld point, same are sufficiently solid and firm to permit forming a good forged weld of highly uniform quality and at high speeds and with very little disturbance of the crystalline structure of the metal. This makes possible forged welds of great strength as compared with other heating methods, such as by the use of direct current, ordinary alternating current or other heating means where the metal becomes softened to such a depth that it cannot be firmly pressed together to form a high strength forged weld because the softened metal will become displaced or more or less collapsed at the regions where the two parts are pressed together.

However, it has been found that with such method of welding by the use of high frequency current, some difficulty arises, for example, when a strip is to be welded on edge to an extended area of another metal member, particularly if the edge of the strip is of substantial thickness. Then, because of what may generally be termed the "skin effect" with high frequency current, the current on the strip edge tends to become more concentrated along the corners of the edge than along the mid-portions of the edge. This may result in overheating and thus softening the metal at such corner portions prior to reaching the weld point, the softening being to a depth such that such corner portions cannot be forcefully pressed against the other member at the weld point with sufficient pressure to there form a good forged weld. As a consequence, and if the strip edges are of some substantial thickness, then only some 70–90% of the strip edge (along its mid-portions) may become satisfactorily forge welded in place, while the metal at each side, viz. along the corners of the strip edge, becomes overheated and extruded to the sides as "slag" metal or the like, including black scale, and small crevices may appear between such extruded metal and the surface of the other workpiece, which crevices or cracks tend to form starting points for breakage when the weld is subjected to stresses. This difficulty is peculiar to the method of heating the strip edge by the use of high frequency current (whether conductively or inductively applied) and because of the strong tendency of such current to seek to flow in its greatest concentrations along the margins of whatever surface to which it is applied.

The present invention has been found to provide a way of fully overcoming this difficulty and so as to permit of a good forged weld along a band equal to 100% or more of the normal or predetermined desired effective width of the strip edge. In order to carry out the invention, the strip edge to be welded is so shaped or reshaped prior to welding, that portions of the metal along the corners of the edge will be made to protrude beyond the boundaries of the cross-section of the normal or predetermined desired square edge. As a consequence, although the high frequency current when flowing along on the strip edge, will still be subject to the so-called "skin effect" and thus be more concentrated and cause more heating along the corners of the edge, yet since the metal at such corners now protrudes beyond the boundaries of the normal corner, it will thus be only such protruding metal which thus becomes overheated, softened and extruded outwardly, while leaving a band of the metal along the strip edge of a width equal to the normal thickness with the strip metal still firm and unsoftened and thus capable of being pressed into firm engagement with the other workpiece at the weld point, thereby forming a good forge weld of a width equal to or, if desired, greater than the width of the normal width of the strip. The protruding metal which is thus upset and extruded to the sides, and including any scale material, and the creviced or cracked portions, may be scarfed away, leaving a clean metal-to-metal forged weld along a band of a width equal to or greater than the normal full thickness of the strip metal. Preferably the strip edge is formed or preformed so that the aforesaid protruding portions extend largely to each side of the strip edge, but alternatively, if desired, the strip edge may be so formed that the protruding portions extend edgewise of the corners of the strip edge. For example, the strip edge may be formed with a somewhat concave or arcuate cross-section to provide the said protruding portions at the corners thereon which are to become overheated and then are extruded outwardly, leaving the whole normal width of the strip edge otherwise firm and in condition for forge welding in place.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of an arrangement of the apparatus for carrying out the invention in its preferred form.

FIG. 2 is a sectional view taken substantially along line 2—2 of FIG. 1.

FIG. 3 is an enlarged sectional view of the strip edge shortly prior to its arrival at the weld point, the stippled areas along the bottom edge in this view indicating generally or approximately the manner in which the high frequency current and consequent heating is distributed thereon, with a greater concentration and greater depth of current occurring on the corners of the edge. In this view the boundary of the normal desired or predetermined edge to be welded is indicated in dash lines.

FIG. 4 is a sectional view taken substantially along line 4—4 of FIG. 1, this view being copied from a macrophotograph of a cross-section of the metal parts after being welded together.

FIG. 5 is a cross-sectional view of the welded metal parts and illustrating the manner in which the extruded metal and the slag and scale material may be scarfed away and with elimination of the crevices or cracks which appear in FIG. 4 beneath the corners of the edge.

FIG. 6 is a view similar to FIG. 3 but illustrating the alternative method according to which the edge of the strip is shaped or reshaped with a somewhat concave formation so that the portions of the metal in which the high frequency current is most concentrated and extends to the greatest depth in the metal, occur beneath the corners of the edge instead of to the sides as in FIG. 3.

FIG. 7 is a view of a further alternative embodiment wherein the strip edges are formed or reformed with the metal at the corners protruding partly downwardly and partly to the sides, thus combining in effect the features of FIGS. 3 and 6.

FIG. 8 is a view showing a strip edge which has not been shaped or reshaped as above referred to and which is in a position approaching another workpiece to be welded thereto.

FIG. 8a is a cross-sectional view of the resulting weld which is formed with such a strip edge, the details of the weld being shown somewhat exaggerated for clearness, this view being illustrative of the difficulties which will occur if the strip edge has not been shaped or reshaped in accordance with the invention.

FIG. 9 illustrates a strip edge about to be brought into welded engagement with another workpiece, the edge here being shaped at its corners with relatively thin protruding portions rather sharply tapered in cross-section.

FIG. 9a shows the resulting weld with such a form of edge, the details of the weld also being shown somewhat exaggerated for clearness, and this view being illustrative of the difficulties which will occur if the strip edge at the corners is not properly reshaped.

Referring now to the drawings in further detail, there is shown in FIG. 1 a workpiece or strip 10 such as adapted to form, for example, a flange on a structural shape and another workpiece or strip 11 such as adapted to form a web for the structural shape when welded on edge to the strip 10 in accordance with the invention. The strip 10 may be longitudinally advanced in the direction indicated by the arrow as by the use of suitable power-driven rollers and supporting rollers, two of which are indicated at 12. Simultaneously and at the same speed, the strip 10 is advanced and controlled in position by suitable rollers, two of which are indicated at 13 and 14. Various other rollers as required may be used properly to condition and control the advance of the strip 11, including for example rollers as at 15, 16 engaging the sides of the strip at the region of the weld point w and a roller as at 17 pressing down against the upper edge of the strip to force same into welded engagement with the strip 10 as the strips pass the weld point. As above explained, either one or both of the strips may approach the weld point along a curved path. As shown here, for example, the strip 11 is advanced along a somewhat curved path, while the strip 10 follows a straight path, so that, in advance of the weld point, a V-shaped gap 18 is formed, having its apex substantially at the weld point and where the pressure roller 17 forces the strip 11 down into forge-welded engagement with the strip 10 and against a supporting roller as at 12', for example, located beneath strip 10.

Current from a high frequency source 19 is applied as by contacts 20 and 21 to the opposite sides of the gap 18 at points shortly in advance of the weld point, so that the current flows from these contacts along the approaching surfaces at opposite sides of the gap to and from the weld point for bringing such surfaces up to welding temperature just as same are brought into pressure engagement at the weld point.

The lower edge 22 of the strip 11, at some time prior to its advance to the weld point, is shaped or reshaped to a configuration such as shown in the somewhat enlarged view of FIG. 3. That is, at the corners of the lower edge of the strip, the metal is so shaped or reshaped as to cause portions, as at 23, 24, to protrude substantially out beyond the normal predetermined width of the strip edge. That is, the lower edge portions at their sides would normally terminate at the dash lines indicated at 25, 26 which are spaced apart by a distance equal to the normal thickness of the strip 11. This reshaping of the strip edge may conveniently be accomplished while the strip is being advanced toward the weld point as by the use of a pair of rollers, as at 27, 28, and if desired, an additional pair or pairs of rollers as at 29, 30. As shown by the cross-sectional view of FIG. 2, the roller 28 has a peripheral groove designed to receive and fit about the upper edge of the strip 11 and this roller may be, by suitable means, forcefully pressed in the direction of the arrow indicated thereon toward the roller 27. The roller 27 is formed with a peripheral groove 27' large enough to receive the lower edge 22 of the strip initially with considerable clearance and under sufficient pressure to cause the sides of the strip edge portion 22 to become bulged outwardly to achieve a formation such as indicated in FIG. 3. If necessary, the other rollers 29, 30, which are respectively like rollers 27, 28, may be used to enlarge and complete the desired reshaping of the edge.

The high frequency current may have a frequency in the range of about 50,000 to 100,000 cycles per second, but preferably a substantially higher frequency of 300,000 to 400,000 cycles per second, or higher. As indicated by the stippled areas in FIG. 3, this high frequency current flowing on the surface of edge 22 will be concentrated quite closely to the surface of the metal between the dash lines 25, 26, that is, over the normal width of the edge, while due to the above-mentioned skin effect, the current at the corners, as indicated at 31, 32, will be substantially more concentrated and will thus cause heating and softening of the metal to a substantial depth generally or approximately indicated by the stippled areas shown at these corners. The dimensions of the various portions, as shown in FIG. 3, are intended to be drawn to scale, so that this figure illustrates the relative proportions of the portions 23, 24 as compared with the thickness of the strip 11, in accord with an appropriate example of the invention. As the edge surface becomes heated to welding temperature at the regions between the dash lines 25, 26, the metal which backs up the surface at these regions will remain firm and unsoftened, whereas at the corner regions 31 and 32, the metal will become softened to a considerable depth, although the portions 23, 24 are preferably made high enough so that a considerable part thereof will still remain firm and unsoftened. As the edge of a formation like or somewhat similar to that of FIG. 3 passes the weld point, it will become welded to the strip 10, with a weld as shown in cross-section in FIG. 4, which was copied from a macrophotograph of the cross-section of a typical example. Here it will be noted that, at the sides of the corners, considerable portions of the metal will have become melted and extruded or bulged irregularly outwardly, as indicated at 33, 34, and beneath these portions, slight crevices or cracks will tend to occur as at 35, 36, separating the extruded metal from the workpiece or strip 10. These bulging portions may include most of such scale material as may have existed on the approaching surfaces of the workpieces and which becomes squeezed outwardly to the sides together with some slag resulting from the overheating of the edge corner portions.

At some point subsequent to the weld point, and as indicated at 37 in FIG. 1, and at 37 and 38 in FIG. 5, suitable scarfing tools may be mounted to engage and remove the extruded metal, slag and scale, including such of the metal as includes the crevices 35 and 36, thus leaving clean, smooth and, if desired, slightly filleted surfaces along the opposite sides of the weld regions, as indicated at 39. Thus a welded structural product is formed in which at least 100% of the normal width of the edge of the strip 11, or possibly more, is firmly welded with a good forged weld to the strip 10, making possible a structure which in appearance and strength is as satisfactory as obtainable if the structure were formed to a T cross-sectional shape in a rolling mill.

It will be understood that if, for example, a beam of H- or I-shaped cross-section is to be formed by welding, then an additional flange strip may be welded along the top edge of the strip 11 by apparatus and methods similar to those above described. In that case, the web strip 10 may enter the apparatus on a straight path, whereas the flange strips may be brought to their respective weld points along somewhat curved paths.

While with the embodiment of edge formations shown in FIG. 3, the metal has been caused to protrude to the opposite sides of the strip edge, yet sometimes, if preferred, the protruding metal portions carrying the concentrations of high frequency current at the corners, may protrude downwardly, as indicated at 40 and 41 in FIG. 6. This may be achieved in a convenient way by simply forming the lower edge of a strip, such as at 11', with a shallow channel as in a form having a concave arcuate surface as shown at 42. With this configuration, although the overheated corner areas, as at 40, 41, will become extruded outwardly to the sides at the time of welding, yet the metal above the dash line indicated in FIG. 6, will remain unmelted and firm, so that over substantially the full width of the strip edge, the metal may be pressed into good forge-welded relation to the other workpiece. Thereafter, as in the case of the embodiment above-described, the extruded, overheated metal, slag and scale may be scarfed away.

As shown in FIG. 7, an edge on a strip 11a is shaped with portions as at 43, 44 protruding to the sides, as well as protruding downwardly somewhat as at 45, 46, thus combining the effects obtainable with the embodiments of FIGS. 3 and 6.

If the present invention is not utilized, and a strip as at 11b in FIG. 8 is left with its lower edge of normal width with square corners at the time of welding, then, as shown in FIG. 8a, the overheated metal at the corners, including the slag and scale, will be extruded irregularly outwardly, as at 47, 48, and the above-mentioned cracks or crevices, as at 49, 50, will tend to occur, leaving only some 70 to 90% of the mid-portions of the edge properly welded in place. Again, if instead of leaving the strip corners square, a strip is used as shown at 11c in FIG. 9, with relatively thin portions as at 51, 52 protruding outwardly at the sides of the corners, then the result upon welding, as shown in FIG. 9a, may be normally as disadvantageous as indicated in FIG. 8a or similar thereto. This arises from the fact that the protruding portions 51 and 52 are not thick enough to leave any solid unmelted back-up metal at the protruding corner portions. The extent of these imperfections is illustrated in somewhat exaggerated form in FIGS. 8a and 9a and the extent thereof will vary depending upon the thickness of the strip edge and the type and characteristics of the metal being welded.

Although certain particular embodiments of the invention are herein disclosed for purposes of explanation, further modifications thereof, after study of this specification will be apparent to those skilled in the art to which the invention pertains. Reference should accordingly be had to the appended claims in determining the scope of the invention.

What is claimed and desired to be secured by Letters Patent is:

1. Method for welding an edge of an elongated strip-like member along a line on another metal member, the strip-like member having a normal thickness transverse to its length corresponding to the predetermined desired width of said edge to be welded and having longitudinally extending corners at said edge, said members being rapidly advanced longitudinally while bringing same together under welding pressure at a weld point and while maintaining same spaced apart in advance of said point by a narrow V-shaped gap terminating at said point, current of a frequency of about 50,000 cycles per second or higher being caused to flow along on the surfaces on the opposite sides of said gap including the face of said edge for heating same to welding temperature upon arrival at the weld point, said method being characterized by forming said edge prior to such heating with portions protruding from and extending along the corners thereof while maintaining said normal thickness of said strip-like member at a portion thereof spaced from said edge in the direction of the width of said strip-like member, said high frequency current, because of the skin effect, being substantially more concentrated along on said protruding portions than on the mid-portions of said edge, and thus acting to heat and soften the metal in said portions to a substantially greater depth than along said mid-portions, the softened metal in said portions becoming extruded to the sides of the strip edge by reason of the welding pressure at the weld point while the metal beneath the surface of said edge over a band thereof of a width at least substantially equal to said thickness of the strip remains firm permitting said pressure to bring the surface thereof into forge-welded relation to the surface of the other member.

2. Method in accordance with the foregoing claim 1 and in which said protruding portions are formed to extend to the sides respectively of the edge of the strip-like member.

3. Method in accordance with the foregoing claim 1 and in which said protruding portions are formed to extend to the sides of said strip-like member and embody sufficient depth of metal whereby portions thereof remain firm and act under said pressure to cause the extrusion of the softened metal therein.

4. Method in accordance with the foregoing claim 1 and in which said protruding portions are formed to extend edgewise of the strip-like member along the corners of said edge.

5. Method in accordance with the foregoing claim 4 and in which said edge is shaped with a concave formation whereby the metal along the corners of the edge is caused to protrude edgewise of the strip as compared with the midportions of the strip edge.

6. Method in accordance with the foregoing claim 1 and in which said softened metal which becomes extruded is overheated and embodies slag and scale and is in the form of irregular masses embodying crevices, and the method being further characterized by scarfing away such extruded metal subsequent to the weld point to eliminate the irregular and creviced portions.

7. Apparatus for welding an edge of an elongated strip-like member along a line on another metal member, the strip-like member having a normal predetermined thickness transverse to its length corresponding to the width of said edge to be welded and having longitudinally extending corners at said edge comprising in combination: means for rapidly advancing said members longitudinally while bringing same together under welding pressure at a weld point and while maintaining same spaced apart in advance of said point by a narrow V-shaped gap terminating at said point; a source of current of a frequency of about 50,000 cycles per second or higher; means for causing such current to flow along on the surfaces on the opposite sides of said gap including the face of said edge for heating same to welding temperature upon arrival at the weld point; and means for forming said edge prior to such heating with portions protruding from and extending along the corners thereof while maintaining said normal thickness of said strip-like member at a portion thereof spaced from said edge in the direction of the width of said strip-like member, said high frequency current, because of the skin effect, being substantially more concentrated along on said protruding portions than on the midportions of said edge, and thus acting to heat and soften the metal in said portions to a substantially greater depth than along said mid-portions, the pressure-applying means acting to cause the softened metal in said portions to be extruded to the sides of the strip edge while the metal beneath the surface of said edge over a band thereof of a width at least substantially equal to said thickness of the strip remains firm permitting said pressure to bring the surface thereof into forge-welded relation to the surface of the other member.

8. Apparatus in accordance with the foregoing claim 7 and in which scarfing means is mounted subsequent to the weld point for scarfing away the extruded material from the sides of the strip edge.

References Cited
UNITED STATES PATENTS

| | | | |
|---|---|---|---|
| 1,606,894 | 11/1926 | Phelps | 219—107 |
| 2,584,189 | 2/1952 | Dalin | 219—107 |
| 2,821,619 | 1/1958 | Rudd | 219—102 |
| 2,827,551 | 3/1958 | Orr et al. | 219—107 |
| 3,010,011 | 11/1961 | Darlington | 219—105 |
| 3,047,712 | 7/1962 | Morris | 219—107 |
| 3,089,947 | 5/1963 | Frungel | 219—107 |
| 3,327,088 | 6/1967 | Rudd | 219—103 |

RICHARD M. WOOD, *Primary Examiner.*

W. DEXTER BROOKS, *Assistant Examiner.*